Feb. 8, 1955 W. R. ISOM 2,701,690
FILM REEL DRIVE MECHANISM
Filed Nov. 15, 1952 3 Sheets-Sheet 1

INVENTOR.
Warren R. Isom
BY
ATTORNEY.

Feb. 8, 1955 W. R. ISOM 2,701,690
FILM REEL DRIVE MECHANISM
Filed Nov. 15, 1952 3 Sheets-Sheet 2

INVENTOR.
Warren R. Isom
BY
ATTORNEY.

Feb. 8, 1955  W. R. ISOM  2,701,690
FILM REEL DRIVE MECHANISM
Filed Nov. 15, 1952  3 Sheets-Sheet 3

INVENTOR.
Warren R. Isom
BY
ATTORNEY.

Patented Feb. 8, 1955

2,701,690

FILM REEL DRIVE MECHANISM

Warren R. Isom, West Collingswood, N. J., assignor to Radio Corporation of America, a corporation of Delaware Application November 15, 1952, Serial No. 320,673

11 Claims. (Cl. 242—55)

This invention relates to motion picture film projectors, and particularly to the film reel drive mechanism for such projectors.

In the projection of motion picture film, both the silent and sound type, the film is supplied from one reel and taken up by a second reel after it passes through the projection gate, and the sound track modulator, if the film is a sound film. After the film has passed through the machine, it is generally rewound back onto the supply reel at a higher rate of speed than the normal projection rate of speed. The present invention is directed to a drive for the normal take-up reel, which provides a constant tension in the film as it is wound onto the take-up reel, and to the drive for the rewind reel. The new rewind drive mechanism has several important features, such as fewer parts than similar mechanisms now in use, a novel combination of the elements for the rewind control with the elements for the film tension control, and a safety warning feature directed to the threading of the film when the drive is in rewind position.

The principal object of the invention, therefore, is to facilitate the projection of motion picture film and the rewinding thereof.

Another object of the invention is to provide an improved film tensioning, take-up reel, and rewind reel drive.

A further object of the invention is to provide a motion picture projector take-up reel drive which maintains substantially constant tension in the film between the reel and film let-off sprocket and a simple changeover mechanism from take-up reel drive to supply or rewind reel drive.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
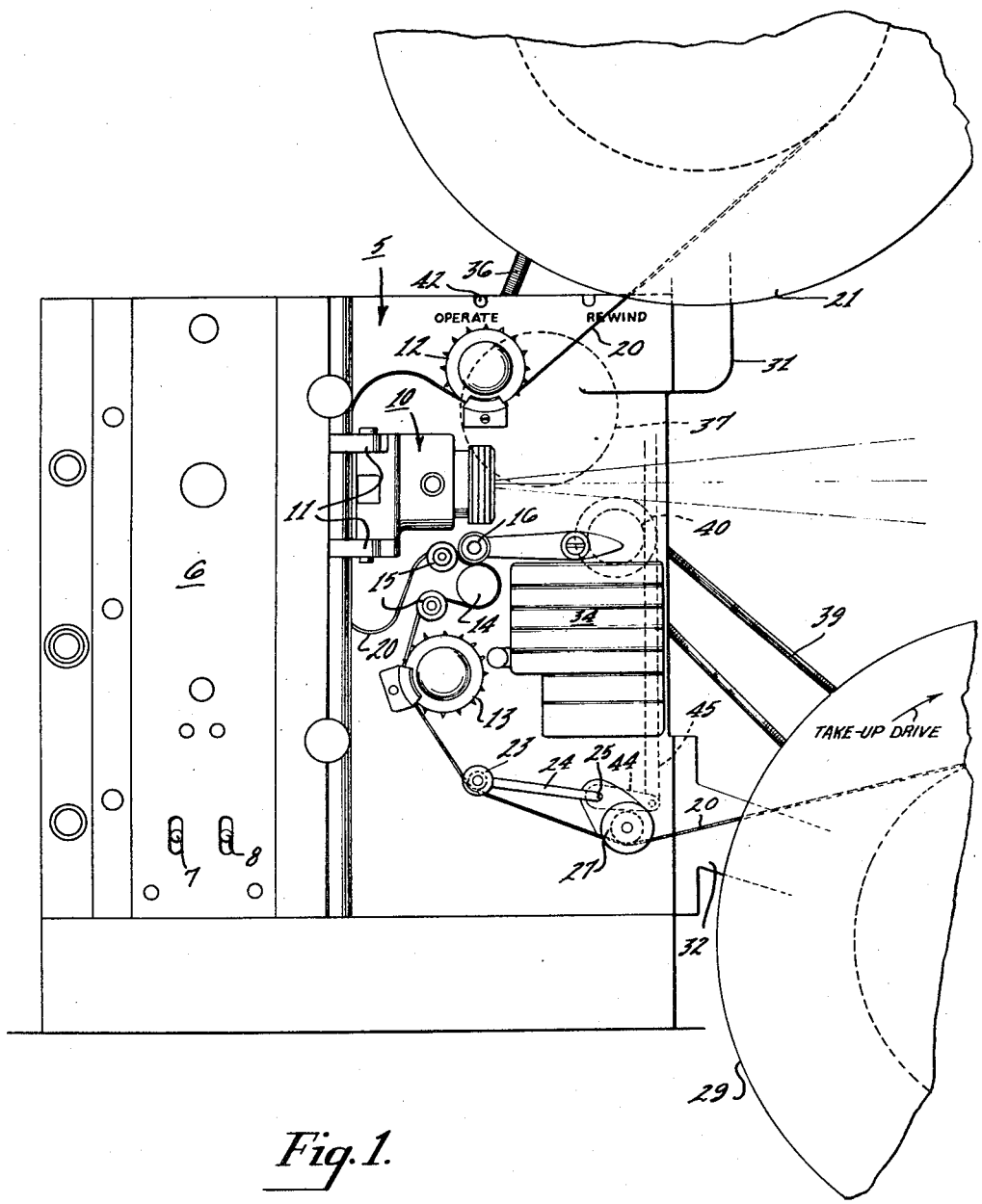
Fig. 1 is a front elevational view of a motion picture film projector embodying the invention and with the drive connected to the take-up reel.
Figure 2:
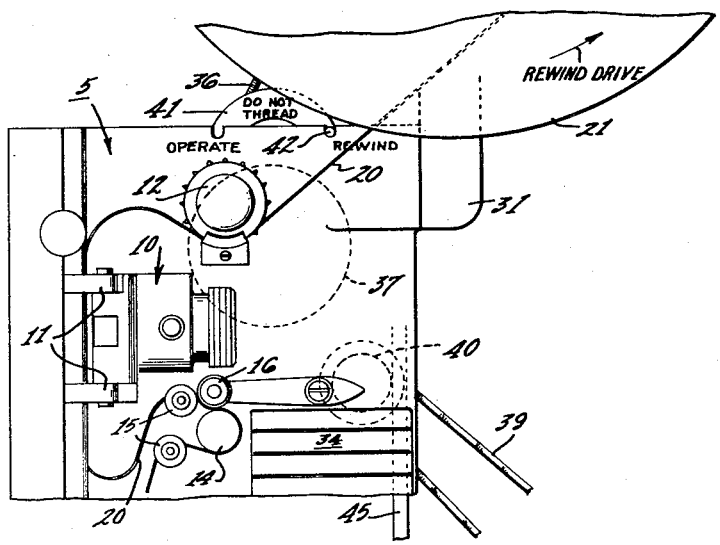
Fig. 2 is a front elevational view showing the drive connected to the supply or rewind reel.

Referring now to the drawings, in which the same numerals identify like elements, a projector frame plate 5 has shown mounted thereon a control panel 6 having light and amplifier control switches 7 and 8, and other normal control knobs for the sound volume, tone, etc. Also mounted on the plate 5, is the projection lens assembly 10 hinged at 11, a feed sprocket 12, a let-off sprocket 13, a flywheel stabilized sound drum 14, guide rollers 15, and a pressure roller 16. A film 20 is shown leaving a supply reel 21, on which the film is also rewound with the invention, then passing under the sprocket 12, through the picture gate, behind the projection lens assembly 10, around the rollers 14, 15, and 16, around the sprocket 13, under a sensing roller 23, mounted on a lever 24, pivoted at 25, under a guide roller 27, to a take-up reel 29. The reel 21 is mounted in a bracket 31, and the reel 29 is mounted on a bracket 32. Sound reproducing elements, such as a photocell and light source, are housed within a casing 34, as is well-known in the art. The reel 21 is driven, when it rewinds the film, by a spring belt 36 passing around a pulley shown by the dotted lines 37. The take-up reel 29 is driven by a wire belt 39 passing around a pulley 40. As shown in Fig. 2, an arcuate lever arm 41 extends above the upper edge of the casing 5 and is shown having one end thereof provided with a handle 42, positioned in the rewind position. At this time, the warning, "do not thread," is exhibited on the arcuate lever arm 41, to indicate that the machine is not to be threaded when in rewind position. In Fig. 1, the handle end 42 is in "operate" position and the lever arm 41 is not observable. A toggle spring 43 (Fig. 5) serves to hold the lever arm 41 positively in either of its aforementioned positions.

In Fig. 1, the sensing roller lever 24 is connected to an arm 44, connected to a rod 45, so that as the tension in the film 20 varies the position of roller 23, the rod 45 will move vertically in a direction determined by the direction of movement of the roller 23. That is, as the film tension increases, the rod 45 will move downwardly, and as the film tension decreases, the rod 45 will move upwardly.

Figure 3:
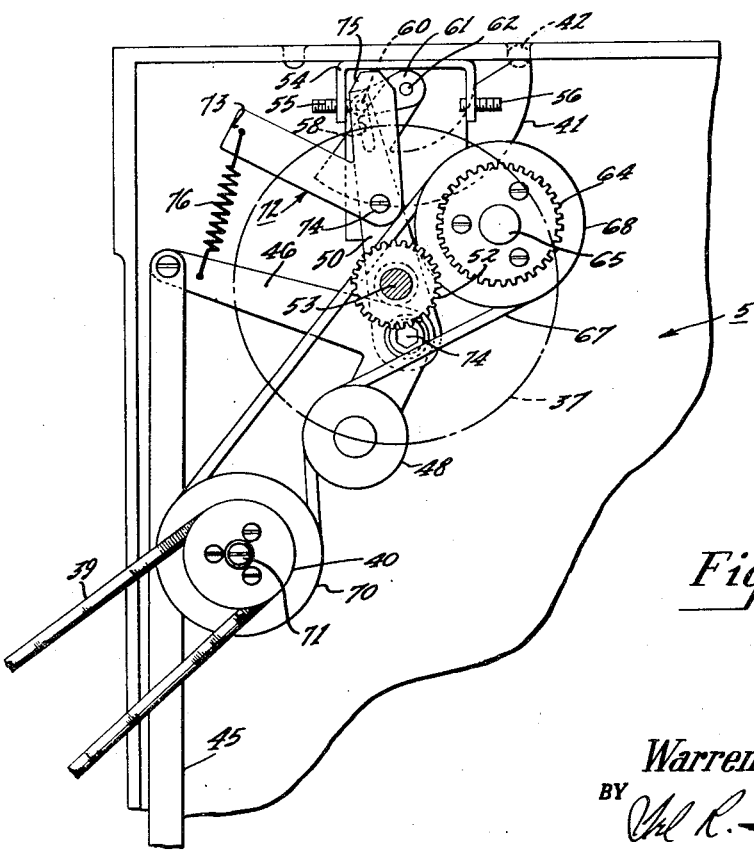
Fig. 3 is a rear elevational view showing the gear shifting mechanism in projection or operation position, as shown in Fig. 1.
Figure 4:
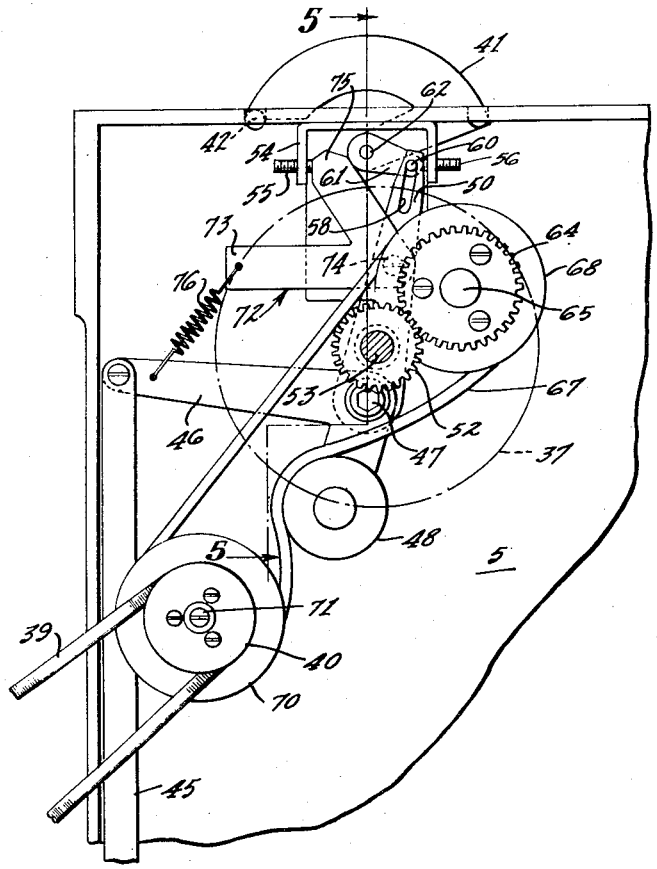
Fig. 4 is a rear elevational view showing the gear shifting mechanism in rewind position, as shown in Fig. 2.
Figure 5:
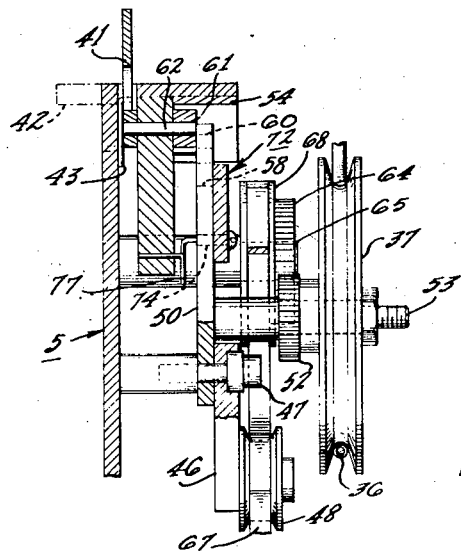
Fig. 5 is a cross-sectional view taken along the line 5—5 of Fig. 4.

Referring now to Figs. 3, 4, and 5, which view the gear shifting mechanism from the rear and side, the lever 45 is shown pivotally connected to the end of a crank arm 46, which is pivoted at 47 and has an idler and belt tensioning roller 48 rotatably mounted on the other end thereof. Also mounted on the pivot 47 is a gear shifting arm or lever 50 carrying a gear 52 rotatable on a shaft 53. The gear 52 has rewind pulley 37 fixedly attached thereto. The other end of arm 50 extends between the legs of a yoke member 54, having adjusting screws 55 and 56 therein for controlling the travel of the end of arm 50. The end of the arm 50 has a slot 58 therein and in which is positioned a pin 60. The pin 60 is mounted on the end of an arm 61, pivoted at 62, and fixedly attached to one end of the arcuate control lever 41, shown in rewind position in Figs. 2 and 4, with the gear 52 in mesh with a drive gear 64 mounted on drive shaft 65 and secured to a pulley 68.

As shown in Fig. 4, the arcuate control lever 41 is in rewind position, the pin 60 having moved the end of arm 50 to the right, carrying the gear 52 into mesh with the gear 64. Set screw 56 adjusts the gear 52 to properly mesh with gear 64. The gear 64 thus drives the pulley 37 and the belt 36 to rewind the film at a speed which is higher than the speed of advancement of the film through the projector which is determined by the speed and size of the sprockets.

Referring, now, to the remainder of the mechanism, a crank arm 72 having an end 73 is pivoted at 74 on the arm 50, the other end 75 of the crank arm 72 being shown adjacent the end of the set screw 55. A tensioning spring 76 has one end anchored on the end 73 of the arm 72, and the other end anchored on the end of arm 46 adjacent its connection to the rod 45. Thus, the pivot point of the arm 72 is shifted when the lever 50 is shifted between its two positions shown in Figs. 3 and 4. The end 75 of the arm 72 is, however, in each instance, held against the end of set screw 55 because of the tension in the spring 76. Thus, the end 73 drops when the arm 50 is shifted to rewind position (see Fig. 4), which shifts the idler roller 48 in a direction to relieve the tension in the belt 67. The take-up reel 29 is now free to rotate as the film is rewound on reel 21. When the lever 50 is shifted to the left to operate position (see Fig. 3), the end 73 of lever 72 is raised, which raises the end of lever 46 shifting the idler roller 48 in a direction to tighten the belt 67, so as to drive the take-up reel pulley 40 through a second pulley 70 to which the pulley 40 is secured, both pulleys being carried by a shaft 71. As shown in Fig. 5, a toggle bias spring 77 is used to aid in maintaining the end 75 of crank arm 72 against screw 55. In many instances, the screw 55 may not be necessary.

Now, to explain the function of the sensing roller 23, for maintaining constant tension in the film between the reel 29 and the sprocket 13. As mentioned above, when the film tension increases, the roller 23 will rise and the rod 45 will move downwardly. This movement will pull the end of arm 46 downwardly and move the idler roller 48 to the right (see Figs. 3 and 4). Movement of the roller 48 to the right will decrease the tension in belt 67, and thus, reduce the driving torque on the pulley 40, which drives the take-up reel, thus decreasing the tension in the film. The reverse action is that when the tension in the film decreases, the roller 23 will move downwardly and the rod 45 upwardly under the tension of spring 76, thus moving the idler roller to the left, which will increase the frictional drive on the take-up reel.

The above invention, therefore, provides a comparatively simple mechanism for maintaining constant tension in the film being wound on the take-up reel, a simple shift control from take-up reel drive to rewind reel drive, and a safety feature by indicating when the mechanism is in rewind position and that the film should not be threaded through the projector.

I claim:

1. A drive for a film take-up reel and a film supply reel comprising a drive gear, a shiftable gear, a supply reel, means connected to said shiftable gear for driving said supply reel, a take-up reel, means for driving said take-up reel from said drive gear, means for connecting said shiftable gear to said drive gear for rewinding film on said supply reel, means for varying the connection between said drive gear and said driving means for said take-up reel, said last mentioned means including a belt and an idler roller for said belt, and means in contact with said film and interconnected with said idler roller for varying the tension of said belt as said film tension varies.

2. A drive in accordance with claim 1, in which said means for connecting said shiftable gear to said drive gear comprises a lever pivoted at one end and having said shiftable gear mounted between the ends thereof, a control lever for shifting the other end of said gear mounting lever, tensioning means between said gear mounting lever and said idler roller, and means for moving said gear mounting lever for varying the tension between said lever and said idler roller.

3. A drive in accordance with claim 1, in which a crank arm pivoted on said gear mounting lever is provided, one end of said crank arm being tensioned toward said idler roller, movement of said crank arm in one direction tightening said belt.

4. A drive in accordance with claim 1, in which a crank arm has said idler roller mounted on one end thereof, a second crank arm being pivoted on said gear mounting lever, one end of each of said crank arms being tensioned toward one another.

5. A film reel drive comprising a supply reel upon which film is adapted to be wound after projection, a take-up reel upon which film being projected is adapted to be wound, a main drive gear, a movable gear adapted to be moved into and out of mesh with said drive gear, belt means between said main drive gear and said take-up reel for driving said take-up reel, said means including an idler roller for tightening said belt to permit said take-up reel to be driven, means connecting said movable gear with said supply reel, and means interconnecting said movable gear and said idler roller, movement of said last mentioned means meshing said movable gear with said drive gear and moving said idler roller to loosen said take-up reel driving belt.

6. A film reel drive in accordance with claim 5, in which are provided means movable by said film as the tension varies in said film being wound on said take-up reel, said interconnecting means being connected thereto for moving said idler roller as the tension in said film varies.

7. A film reel drive in accordance with claim 5, in which said interconnecting means includes an arm pivoted on one end and on which said movable gear is mounted between the ends thereof, movement of said arm to one position meshing said gear with said drive gear and releasing said idler roller from said belt, and movement of said arm to its other position tightening said belt and disengaging said gears.

8. A film reel drive in accordance with claim 5, in which said interconnecting means includes a lever arm, and a pair of crank arms, said lever arm being pivoted at one end and on the same axis as one of said crank arms, the other of said crank arms being mounted on said lever arm, a spring for tensioning one end of one crank arm toward one end of said other crank arm, said movable gear being mounted on said lever arm and said idler roller on the end of one of said crank arms.

9. A film reel drive in accordance with claim 8, in which a sensing roller in contact with said film is provided together with means connecting said sensing roller with one end of said crank arm carrying said idler roller.

10. A film reel drive comprising a drive gear, a pair of reels to be driven at mutually exclusive times, a first belt and pulley means for connecting one of said reels to said drive gear, said means including belt tension varying means, a shiftable gear, a second belt and pulley means for connecting the other of said reels to said shiftable gear, a pivoted lever on which said shiftable gear is mounted, and means interconnecting said lever and said first belt tensioning means, movement of said lever in one direction meshing said gears and relieving the tension in said first belt means, and movement of said lever in the opposite direction unmeshing said gears and increasing the tension in said first belt means.

11. A film reel drive in accordance with claim 10, in which means movable by the film with varying tensions therein is connected to said first belt tension varying means for varying said first belt means tension in the reverse direction of that of the tension variation in said film.

References Cited in the file of this patent

UNITED STATES PATENTS

| | | |
|---|---|---|
| 1,926,862 | Wellman | Sept. 12, 1933 |
| 2,069,595 | Thomas | Feb. 2, 1937 |
| 2,207,075 | Sperry | July 9, 1940 |
| 2,408,320 | Kuhlik | Sept. 24, 1946 |
| 2,539,858 | Offutt | Jan. 30, 1951 |
| 2,540,299 | Shoup et al. | Feb. 6, 1951 |